United States Patent [19]

Danby

[11] Patent Number: 5,006,772
[45] Date of Patent: Apr. 9, 1991

[54] POSITION MONITOR FOR A STEPPER MOTOR

[75] Inventor: Clive M. Danby, Rockford, Ill.

[73] Assignee: Sundstrand Corporation, Rockford, Ill.

[21] Appl. No.: 439,720

[22] Filed: Nov. 21, 1989

[51] Int. Cl.$^5$ ............................................... H02P 8/00
[52] U.S. Cl. ..................... 318/696; 318/685; 364/173; 123/440
[58] Field of Search ................ 318/696, 685; 364/173; 123/440

[56] References Cited

U.S. PATENT DOCUMENTS

4,144,804  3/1979  O'Keefe ........................... 364/173 X
4,380,985  4/1983  Otsuka et al. ........................ 123/440

Primary Examiner—William M. Shoop, Jr.
Assistant Examiner—Saul M. Bergmann
Attorney, Agent, or Firm—William D. Lanyi

[57] ABSTRACT

A position monitor is provided for use in conjunction with a stepper motor wherein two imputs are provided to the monitor from the stepper motor phase windings. A first signal is provided which indicates, by pulses, the rising and falling edges of in the magnitudes of both phase winding signals. A second signal is provided to indicate the direction of rotation of the stepper motor. The first and second signals are used as inputs to a plurality of counters which maintain a digital value representing the position of the stepper rotor. The digital value is converted to an analog value and amplified for use as a signal representing, by its magnitude, the precise position of the rotor of the stepper motor. The monitor therefore maintains a digital value and outputs a voltage signal which represent the position of a stepper motor rotor as it rotates through a plurality of clockwise and/or counter-clockwise revolutions.

37 Claims, 3 Drawing Sheets

POSITION MONITOR FOR A STEPPER MOTOR

BACKGROUND OF THE INVENTION

1. Field of The Invention

The present invention is generally related to a position monitoring device for use with a stepper motor and, more particularly, to a position monitoring device and method which determine the position of a stepper motor by monitoring the voltage magnitudes of command signals issued to the phase windings of the stepper motor from an external control device.

2. Description of The Prior Art

Many different types of devices have been employed to monitor the position of the rotor of a stepper motor. These devices have employed at least two distinct philosophical approaches to perform this function. A first approach is to physically attach a device to the rotor of the motor and monitor the movement of that device as the rotor rotates about its central axis. A second approach is to monitor the phase windings of the stepper motor and respond to the magnitude of current or voltage in those phase windings.

U.S. Pat. No. 4,827,203, which issued to Sakano on May 2, 1989, discloses a rotor position detector for a motor which is capable of detecting an absolute rotation position of a rotor shaft for a single revolution of the shaft. The rotational position detector of the Sakano patent also detects, simultaneously with the absolute detection, a rotor magnetic pole rotation position for motor driving control. The absolute rotational position of the rotor shaft in a single revolution of the rotor shaft is detected and a coded signal representative of the detected position is output. The coded signal is converted into a rotor magnetic position signal for motor driving control by a code converting circuit and is provided as an output therefrom.

U.S. Pat. No. 4,791,343, which issued to Ahrendt on Dec. 13, 1988, provides a stepper motor shaft position sensor which differentiates the current provided when the stepper motor is excited by a step command voltage. This differentiated current is, in effect, a signature that is indicative of whether or not the motor shaft has actually taken the commanded step. If the differentiated current falls below a predetermined magnitude within a predetermined interval the motor shaft is determined to have actually taken the commanded step as indicated by a sensor output at a predetermined logic level. Otherwise, the sensor output is at another predetermined logic level indicated that the commanded step has not actually been taken and the motor is in a stalled condition. The sensor output is applied to a utilizing means which provides a continuous verification of the stepper motor shaft position.

U.S. Pat. No. 4,074,179, which issued to Kuo et al on Feb. 14, 1978, discloses a position detection method and apparatus for use in conjunction with stepper motors. The device and method of the Kuo et al patent indicates the position of a stepping motor rotor as it successfully steps and without the need for physically driven encoders or pulse generators. It is characterized by arrangements for sensing the current or the rate of change of current flowing in the phase winding of the stepping motor.

Japanese Patent No. 60-16190, which was filed on July 5, 1983 and laid open on Jan. 26, 1985, discloses a system for detecting the position of a stepping motor. Using voltage signals received from the phase windings of the stepping motor, the disclosed device forms clock signals which correspond to the number of movement steps of a stepping motor. The clock signals are provided for the purpose of detecting the rotational position of a stepping motor. Rotate signals are provided which determine the rotational direction of the stepping motor. The clock signals are obtained from a one-shot pulse generator and produces pulses that are based on two drive signals having phases which are 90 degrees apart. The rotate signals are obtained from a phase judging means which receives two drive signals and detects the drive signal which rises first.

Certain applications require that a stepper motor be monitored in such a way that the position of the rotor of the stepper motor is accurately determined even when the stepper motor rotor has been caused to rotate numerous complete revolutions in both the clockwise and counter-clockwise directions. For example, in one very specific application for which the present invention is suitable, a stepper motor is intended to be used to drive a valve between completely opened and completely closed positions with a requirement that the valve be accurately positioned at intermediate locations between those extremes. If the connection between the stepper motor rotor and the valve seat is such that a large number of rotations of the rotor is needed to cause the valve seat to travel from its completely opened to its completely closed positions, some means must be provided to accurately monitor the number of complete revolutions and partial revolutions of the rotor and not merely the angular position between the rotor and the stepper motor stator. The monitoring means must also be able to maintain an accurate representation of the rotor position even though the stepper motor has experienced numerous clockwise and counter-clockwise movements as the valve seat moves back and forth not only between the extremes of travel but also between intermediate positions.

In one particular example of an application which requires this type of monitoring, a stepper motor is used to drive a valve seat between extreme positions of the valve that require over 40 revolutions of the stepper motor rotor. Therefore, the monitoring means must be capable of determining not only the relative angular position of the rotor with respect to the stepper motor stator but, in addition, the monitoring means must be able to determine the number of complete and partial revolutions that the rotor traveled relative to a predetermined reference position of the valve seat, such as one extreme end of its travel.

SUMMARY OF THE INVENTION

The present invention fulfills the requirements described above by providing an output signal with a magnitude that continually represents the current position of the rotor of the stepper motor. It comprises a first means, which is connected in signal communication with the stepper motor, for providing a first signal and a second signal. The first signal comprises a plurality of pulses, wherein each of the plurality of pulses represents a voltage magnitude change of a phase winding of the stepper motor. The second signal represents the direction of rotation of the stepper motor rotor. The present invention also comprises a second means, which is connected in signal communication with the first providing means, for providing a third signal whose magnitude is representative of the rotational position of the stepper motor rotor. The magnitude of the third signal is a function of both the first and second signals provided by the first providing means of the present invention. In a preferred embodiment of the present invention, the second providing means comprises means for storing a digital value that represents an accumulation of the plurality of pulses and also comprises a means for selectively increasing and decreasing the digital value, upon each occurrence of one of the plurality of pulses, as a function of the second signal. In other words, the first signal comprises a plurality of pulses in which each of the pulses represents a predetermined magnitude of rotation of the rotor of the stepper motor. The second signal represents a directional signal that is indicative of the direction of rotation of the stepper motor rotor. With these two signals provided as inputs to the second providing means, that second providing means increases or decreases the digital value in response to the receipt of each pulse and determines whether to increase or decrease the digital value based on the logic level of the second signal. In other words, in one exemplary preferred embodiment of the present invention, the accumulated signal is increased for each pulse which occurs while the rotor is moving in a clockwise direction and the accumulated signal is decreased for each pulse that occurs when the rotor is moving in a counter-clockwise direction. Therefore, as the rotor continues to rotate in response to an external stepper motor control circuit, the second providing means continues to accumulate pulses, either in a positive or negative manner, so that the accumulated magnitude of the digital value continually represents the accumulated rotational travel of the rotor and, therefore, the current position of any device driven by the rotor.

In order to provide the position monitor for a stepper motor described above, the present invention provides a first means for receiving a first input signal that represents the voltage magnitude of a first phase winding of a stepper motor. It also comprises a first means for inverting that first input signal to form a first inverted input signal. The present invention comprises a second means for receiving a second input signal that represents the voltage magnitude of a second phase winding of the stepper motor and, in addition, comprises a second means for inverting the second input signal to form a second inverted input signal. The present invention also comprises a means for forming individual pulse signals which represent changes in voltage magnitude of the first input signal, the first inverted input signal, the second input signal and the second inverted signal. In addition, the present invention comprises a means for providing a first signal which, in turn, comprises a plurality of pulses, wherein each of the plurality of pulses represents the occurrence of one and only one of the individual pulses provided by the forming means. In order to determine the rotational direction of the stepper motor rotor, the present invention also comprises a means for delaying the first input signal and providing a second signal when either said delayed first input signal or the second input signal is logically high, but not when both the delayed first input signal and second input signal are logically high. For the purpose of accumulating the pulses and monitoring the precise position of the rotor, the present invention also comprises a means for maintaining a digital value and a means for changing the magnitude of the digital value, as a function of the second signal, upon each occurrence of one of the plurality of pulses of the first signal.

The process performed by the present invention comprises the steps of receiving a first input signal representing the voltage magnitude of a first phase of the stepper motor, receiving a second input signal representing the voltage magnitude of a second phase of the stepper motor, providing a first signal which comprises a plurality of pulses wherein each of the plurality of pulses represents a voltage magnitude change of the first or second input signals, providing a first delayed input signal by delaying the first input signal and comparing the first delayed input signal with the second input signal and providing a second signal when either the first delayed input signal or the second input signal is logically high, but not when both the first delayed input signal and the second input signal are logically high. The process performed by the present invention also comprises the steps of storing a digital value whose magnitude is representative of the accumulation of the plurality of pulses of the first signal.

BRIEF DESCRIPTION OF THE DRAWING

The present invention will be more completely understood from a reading of the description of the preferred embodiment in conjunction with the drawing in which.

DESCRIPTION OF THE PREFERRED EMBODIMENT

Throughout the description of the preferred embodiment, like reference numerals and letters will be used to indicate like components and signals, respectively.

Figure 1:
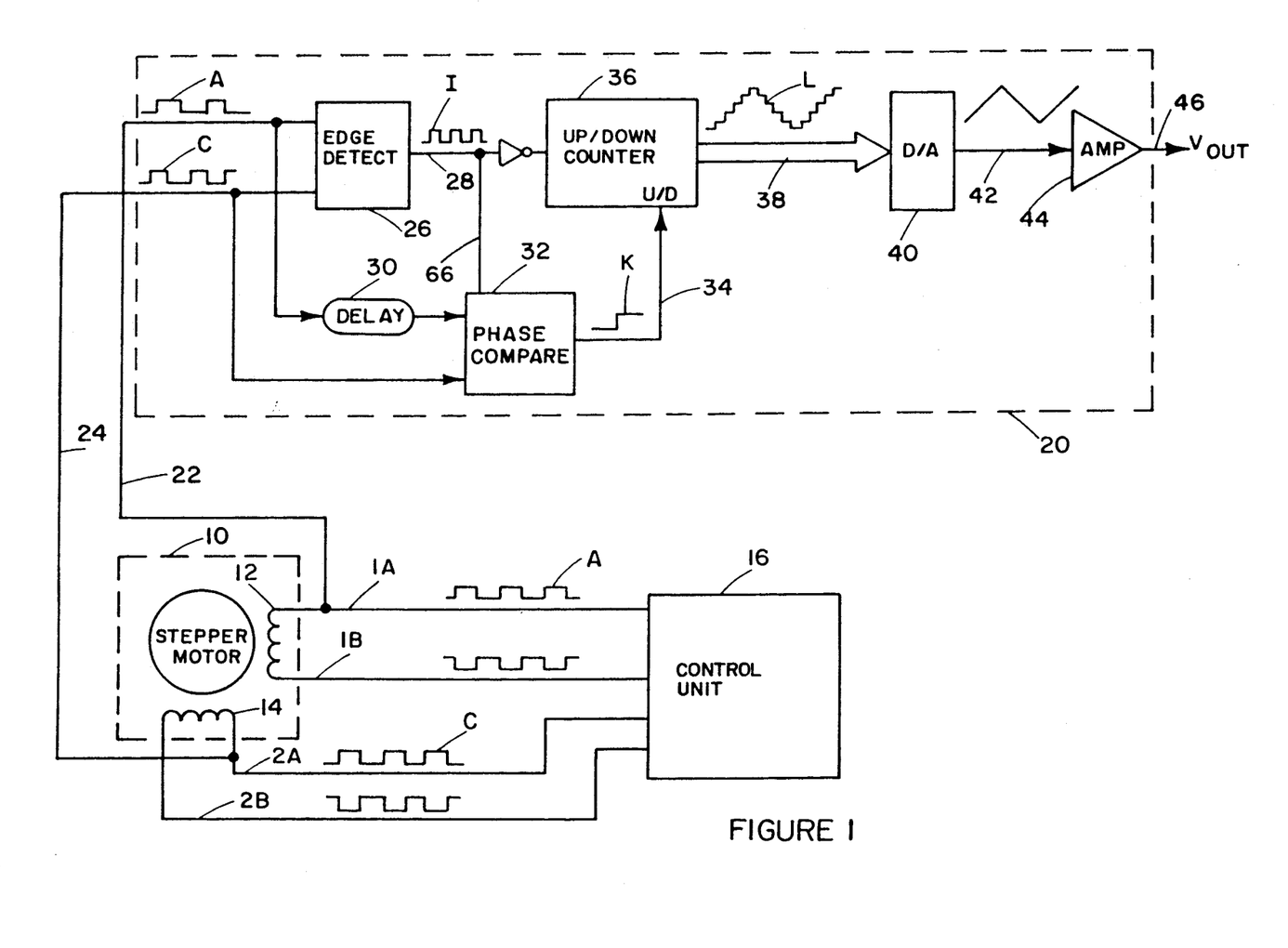
FIG. 1 represents a simplified schematic of the present invention connected in signal communication with the phase winding of a stepper motor.

FIG. 1 illustrates the present invention connected in signal communication with the phase windings of a stepper motor. The stepper motor 10 is illustrated by a dashed line in which two phase windings, 12 and 14, are shown. The stepper motor 10 is connected to a control unit 16 which provides signals on lines 1A, 1B, 2A and 2B. Representative illustrations of those signals are shown proximate each of the control lines.

The present invention 20 is connected in signal communication with the two phase windings, 12 and 14, of the stepper motor. For example, line 1A of phase winding 12 is connected to the present invention by line 22 and line 2A is connected in signal communication with the present invention by line 24. Lines 22 and 24 are connected in signal communication with an edge detecting means 26 which provides a series of pulses, on line 28, wherein each of the pulses represents a rising or falling edge of either of the two signals received on lines 22 and 24. In other words, each time that either of the signals on lines 22 or 24 rises or falls, a pulse is provided as an output from the edge detecting means 26 on line 28.

The signal received on line 22 is delayed by a delaying means 30 which provides the delayed signal as one input to a phase comparing means 32. The signal received on line 24 is provided as another input to the phase comparing means 32. The phases are compared and an output is provided on line 34 which represents the rotational direction of the rotor of the stepper motor 10. The first signal, on line 28, which is synchronized to the plurality of pulses on line 28 and which comprise a plurality of pulses, is provided as an input to an up/down counter 36. The second signal, which is provided as an output from the phase comparing means 32 on line 34, is provided as a directional indicator to the up/down counter 36. Upon each occurrence of a pulse on line 28, the up/down counter 36 adds a count to an accumulated digital value or subtracts a count from the accumulated digital value based on the logical level of the signal received on line 34.

The up/down counter 36 continuously provides a digital value as an output 38. This digital value output 38 represents the accumulated counts that, in turn, digitally represent the position of the rotor of the stepper motor 10. In a preferred embodiment of the present invention, this digital representation is in a binary format. A typical exemplary representation of the changing accumulated digital value L is represented proximate the output 38 in FIG. 1. The digital output 38 of the up/down counter 36 is provided as an input to a digital-to-analog converter 40. The digital-to-analog converter 40 converts the digital value 38 to an analog current value on line 42. The analog current value is represented by the illustration proximate line 42. This analog current value is converted from a current signal to a voltage signal by the operational amplifier 44 and provided as an output on line 46. This output is an analog voltage signal whose magnitude represents the current position of the rotor of the stepper motor 10.

Figure 2:
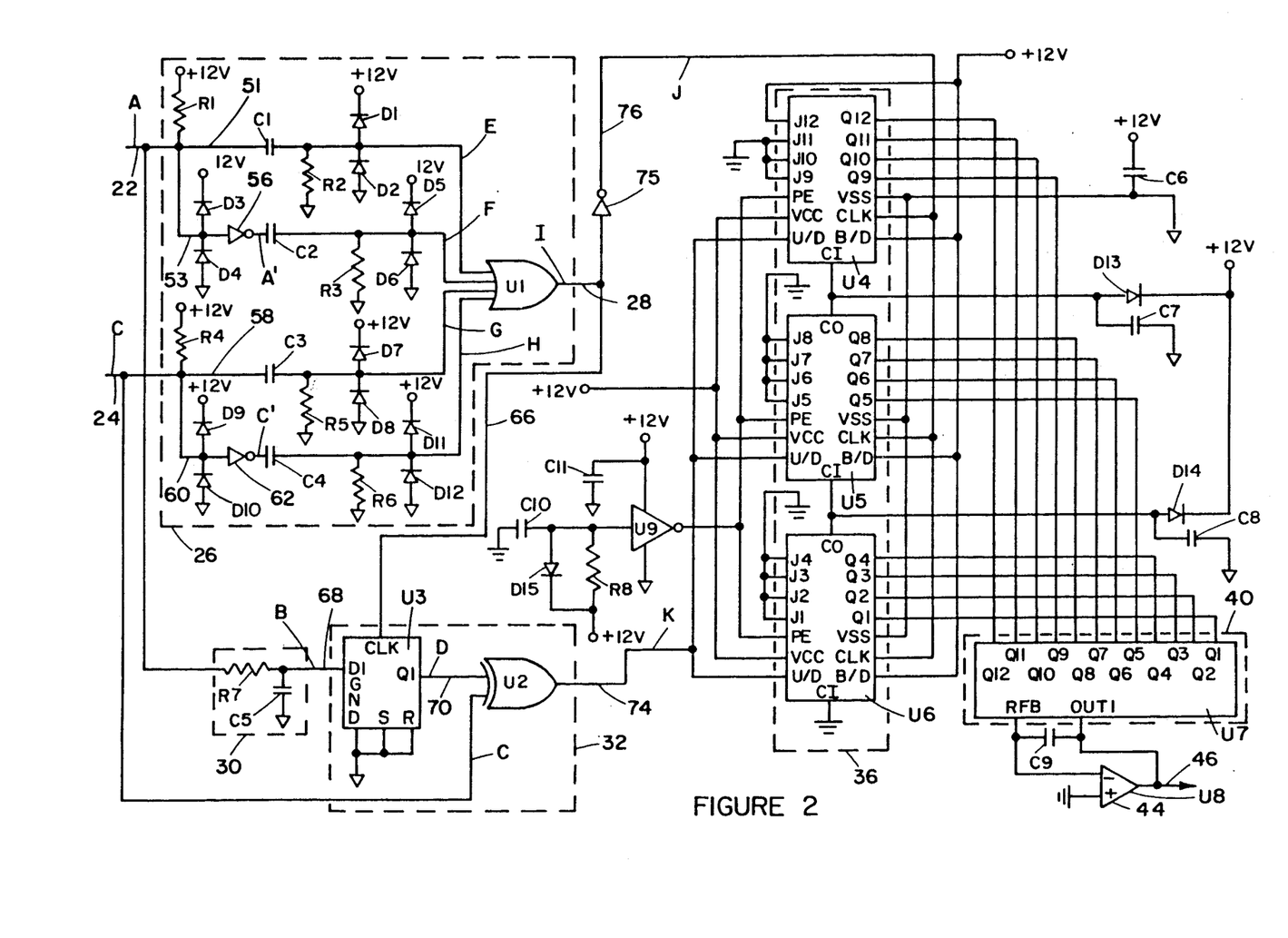
FIG. 2 illustrates a detailed schematic of the present invention.
Figure 3:
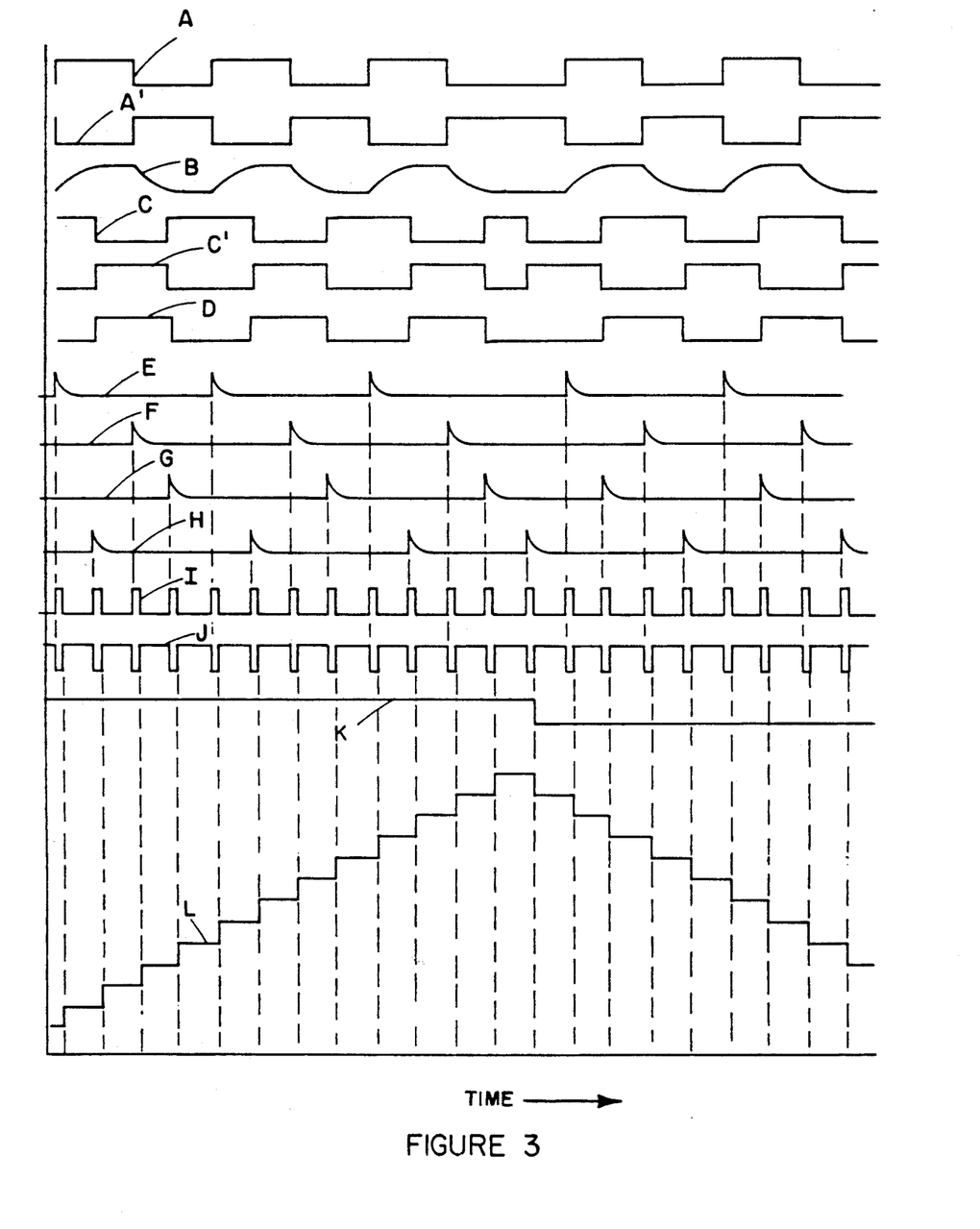
FIG. 3 illustrates a timing diagram of various signals which occur at selected points of the circuit shown in FIG. 2.

FIG. 2 illustrates a detailed schematic of a preferred embodiment of the present invention. Input lines 22 and 24 are connected to the phase windings of the stepper motor (reference numeral 10 in FIG. 1). FIG. 3 is a timing diagram showing numerous signals which are relevant to the description of the preferred embodiment of the present invention. The signals in FIG. 3 are identified by letters A–L, wherein each of the letters is used to define a specific wave form which would be sensible at a particular location identified in the detailed schematic of FIG. 2. The specific locations where each of the wave forms A–K occur are labeled with the appropriate letter in FIG. 2 and wave form L should be understood to represent the magnitude of the stored value in the counters U4 U5 and U6.

As can be seen in FIG. 2, wave form A, which is received on line 22 from one of the phase windings of the stepper motor, is transmitted on lines 51 and 53. As the signal travels along line 51, the capacitor C1 responds to changes in the magnitude of signal A and provides a pulse signal E in response to the rising and falling "edges" of wave form A. It should be noted that transient and negatively directed pulses emanating from capacitor C1 are prevented from reaching the OR device U1 by the operation of diodes D1 and D2. Therefore, upon each rise of wave form A, a signal pulse E is transmitted to a first one of the four inputs of OR device U1.

Wave form A is also transmitted on line 53 and is inverted by the inverter 56 to form inverted signal A'. The inverted form A' of the wave form A is operated upon by capacitor C2 to produce pulse wave form F in response to rising edges of the inverted wave form. Those positively directed pulses F are received as a second input of the OR device U1.

Wave form C, which is received on line 24 from the second phase winding of the stepper motor, is transmitted on lines 58 and 60 in a manner similar to the operation performed on wave form A on lines 51 and 53. In other words, capacitor C3 provides a pulse wave form G in response to rises of wave form C and these pulses are provided as an input to the four input OR device U1. The transmission of wave form C on line 60 causes the wave form to be inverted by inverter 62 and the inverted wave form C' is received by capacitor C4 which provides a pulse wave form H in response to rises in the inverted wave form C' and these pulses are received as the fourth input of the OR device U1. It should be noted that diodes D5–D12 perform functions similar to the functions performed by diodes D1 and D2, as described above. Resistors R1 and R4 operate as pull-up resistors which are used to connect lines 22 and 24 to a 12 volt supply. Dashed line 26 encloses the specific components used in a preferred embodiment of the present invention to provide the edge detecting function identified by reference numeral 26 in FIG. 1. The output of the edge detecting means 26 is illustrated by wave form I that is provided as an output from the OR device U1.

In summary of the operation of the edge detecting means 26, each time any of the wave forms, A, A', C or C', experience a rise in magnitude, a pulse is provided as an output from the OR device U1. Those pulses form a first signal of the present invention and the plurality of pulses is illustrated by wave form I in FIG. 3.

Wave form A, on line 22 in FIG. 2, is also received by a delaying means 30 which is also illustrated in FIG. 1. The delaying means 30 delays wave form A and provides an output which is identified by letter B in FIG. 2 and illustrated as wave form B in FIG. 3. That wave form is received by a D-type flip-flop U3 as a data input to the flip-flop U3 on line 68. The output from the OR device U1, identified as wave form I, is received as the clock input of the flip-flop U3 on line 66. The operation of flip-flop U3, as caused by the receipt of the clock signal on line 66 and the data input signal B on line 68, provides a Q1 output which is identified as wave form D in FIG. 3 and shown on line 70 in FIG. 2. Wave form D is connected to one input of a two-input exclusive-OR device U2. The other input of device U2 is connected to line 24 to receive wave form C. The dashed line 32 in FIG. 2 represents the phase comparing means of FIG. 1 which is also identified by reference numeral 32. In a preferred embodiment of the present invention, the phase comparing means 32 comprises the flip-flop U3 and the exclusive-OR device U2. The output of exclusive-OR device U2 is wave form K which is provided as an output on line 74 and illustrated in FIG. 3.

The output of OR device U1, which is identified as wave form I in FIG. 3, is inverted by the inverter 75 and is transmitted in its inverted form J on line 76 to the clock inputs of the three counters, U4, U5 and U6. The output from exclusive-OR device U2, which is identified and illustrated as wave form K in FIG. 3, is transmitted on line 74 to the up/down inputs of Counters U4, U5 and U6. The magnitude of wave form K represents the rotational direction of the rotor of the stepper motor 10 which is illustrated in FIG. 1. Therefore, as the inverted clock pulses J are received on line 76 by the counters, the up/down input of the counters receive wave form K to determine whether the clock pulses are to be added to or subtracted from the existing digital count stored by the counters. Each of the three counters is capable of storing a four bit count and, as connected in a preferred embodiment of the present invention, the combination is capable of storing a twelve bit count which can represent a maximum magnitude of 4095. The output lines from counters U4, U5 and U6, which are identified as outputs Q1–Q12, are connected as shown to the inputs of a digital-to-analog converter U7. The combined signals are analogous to signal 38 in FIG. 1. The converter U7 converts the twelve bit binary digital input 38, which is represented by wave form L in FIG. 3 and received at inputs Q1–Q12, to an analog current output which is provided to an amplifier U8. Dashed line 36 in FIG. 2 represents the components which comprise the up/down counter 36, which is also shown in FIG. 1, in a preferred embodiment of the present invention. The data transmission represented by reference numeral 38 in FIG. 1, is illustrated by the plurality of lines in FIG. 2 which connect the outputs from devices U4, U5 and U6 to the inputs of device U7 which is shown enclosed by dashed line 40 in FIG. 2. Dashed line 40 represents the component which comprises the digital-to-analog converter U7. The amplifier U8 shown in FIG. 2 corresponds to the amplifying means 44 illustrated in FIG. 1. It should be understood that amplifying means 44 represents an operational amplifier U8 and the primary function of the operational amplifier is to convert an analog current signal to an analog voltage signal.

The specific components, illustrated in FIGS. 1 and 2, which are intended for use in a preferred embodiment of the present invention will be described below and identified in Table I. The OR device U1 is available in commercial quantities from RCA as type number CD4072. Depending on the specific application of the present invention, various alternative types of four-input OR devices can be used. Exclusive-OR device U2 is available in commercial quantities from RCA and is identified as type CD4070. The D-type flip-flop U3 is available in commercial quantities from RCA and is identified as type CD4013.

The counters, U4, U5 and U6, are available in commercial quantities from RCA and are identified as type CD4029. This type of counter consists of a four stage binary or BCD-decade up/down counter with provisions for look ahead carry in both counting modes. The inputs consist of a single clock, carry-in (clock enable), binary/decade, up/down, preset enable and four individual JAM signals. Q1, Q2, Q3, Q4 and a carry out signal are provided as outputs.

The digital-to-analog device U7 is available in commercial quantities from Micropower Systems as identified by type MP7623. This digital-to-analog converter, or DAC, which is identified by reference numeral U7 in FIG. 2 and by reference numeral 40 in FIG. 1, is a plug in replacement for industry standard 7541, provides a twelve bit digital-to-analog conversion and is TTL/CMOS compatible. The amplifier identified by reference numeral 44 in FIG. 1 and reference numeral U8 in FIG. 2, is an operational amplifier which is available in commercial quantities from Precision Monolithics Incorporated as identified by type OP-227. It is a dual low-noise low-offset instrument. All of the devices illustrated in FIG. 2 including the capacitors, resistors and diodes, are identified by reference numeral and type or value in Table I shown below.

TABLE I

| REFERENCE | TYPE OR VALUE |
| --- | --- |
| U1 | CD4072 (RCA) |
| U2 | CD4070 (RCA) |
| U3 | CD4013 (RCA) |
| U4 | CD4029 (RCA) |
| U5 | CD4029 (RCA) |
| U6 | CD4029 (RCA) |
| U7 | MP7623 (MPS) |
| U9 | CD4016 (RCA) |
| U8 | OP-227 (PMI) |
| R1 | 1.2K-Ohms |
| R2 | 60K-Ohms |
| R3 | 60K-Ohms |
| R4 | 1.2K-Ohms |
| R5 | 60K-Ohms |
| R6 | 60K-Ohms |
| R7 | 4.99K-Ohms |
| R8 | 10K-Ohms |
| C1 | 0.01 Microfarads |
| C2 | 0.01 Microfarads |
| C3 | 0.01 Microfarads |
| C4 | 0.01 Microfarads |
| C5 | 0.01 Microfarads |
| C6 | 0.1 Microfarads |
| C7 | 0.1 Microfarads |
| C8 | 0.1 Microfarads |
| C9 | 0.001 Microfarads |
| C10 | 0.1 Microfarads |
| C11 | 0.1 Microfarads |
| D1 | IN4002 |
| D2 | IN4002 |
| D3 | IN4002 |
| D4 | IN4002 |
| D5 | IN4002 |
| D6 | IN4002 |
| D7 | IN4002 |
| D8 | IN4002 |
| D9 | IN4002 |
| D10 | IN4002 |
| D11 | IN4002 |
| D12 | IN4002 |
| D13 | IN4002 |
| D14 | IN4002 |
| D15 | IN4002 |

With reference to FIG. 3, input wave forms A and C represent the changing magnitudes of the voltage signals provided to the phase windings of the stepper motor (reference numeral 10 in FIG. 1). Signals A and C are received as first and second input signals and inverted to create the first and second inverted input signals A' and C'. Wave forms E, F, G and H represent the pulses emanating from capacitors C1, C2, C3 and C4 shown in FIG. 2 and described above. Those pulses are received as inputs by the four-input OR device U1. The receipt of these pulses result in an output wave form I, referred to herein as a first signal, wherein each pulse of wave form I represents the rising and falling edges of either of the two input wave forms A and C.

Wave form B represents the output of the delaying means 30. By comparing wave form I with wave form B, it can be seen that the operation of the D-type flip-flop U3 results in wave form D, referred to herein as a first delayed input signal, which is transmitted on line 70 to one input of the two-input exclusive-OR device U2. By comparing wave form C and wave form D, it can be seen that wave form K, referred to herein as the second signal, results as an output from the exclusive-OR device U2. By inverting wave form I, as a function of the operation of inverter 75, wave form J has a rise portion which is delayed with respect to the rise portion of wave form I by the width of the pulse of wave form I. This slight delay improves the accuracy of the present invention by assuring that the rise of the pulse of wave form J occurs after the change in magnitude of wave form K. This is illustrated in the timing diagram of FIG. 3.

Wave form L represents the magnitude of the digital value stored by the cumulative efforts of counters U4, U5 and U6. Although illustrated in conjunction with the other wave forms in FIG. 3, it should be understood that the representation shown as wave form L does not represent a voltage magnitude but, instead, a digital value that is represented at the combined outputs Q1–Q12 of devices U4, U5 and U6. Wave form L is illustrated in this manner because of the fact that the outputs from the counters are connected directly to a digital-to-analog converter U7 which converts the wave form L of FIG. 3 to a current magnitude that represents the digital value stored in the counters and which provides a current output to the amplifier U8 which connects the current signal to a voltage signal. The timing diagram of FIG. 3 illustrates the changing digital value of wave form L with respect to the magnitudes of the other wave forms that exist throughout the illustration of FIG. 2.

The portion of the circuit in FIG. 2 which comprises device U9, capacitors C10 and C11, resistor R8 and diode D15 is used to provide a predetermined power up sequence for the present invention in one preferred embodiment. Device U9 is a CMOS Schmitt trigger that is available in commercial quantities from RCA and is identified as type CD40106. This type of device is supplied in 14-lead hermetic dual-in-line packages. The output of device U9 is connected to the preset enable, on PE, inputs of devices U4, U5 and U6. During the power up sequence, the logical statuses of pins J1–J12 of the counters U4, U5 and U6 are transferred to their Q1–Q12 outputs. As shown in FIG. 2, a preferred embodiment of the present invention grounds inputs J1–J11 and connects input J12 to a +12 volt source. This causes outputs Q1–Q12 to assume a binary value with a magnitude of 2048 following the power up sequence. This value is at the mid-range of the maximum count of 4095 of the 12-bit counter arrangement. It should be understood that many other suitable power up configurations are possible in alternative embodiments of the present invention.

In a specific application of the preferred embodiment of the present invention, it is intended to be associated with a stepper motor such as type SM200-0080DC from the Warner Electric Brake and Clutch Company. In a specific exemplary application of the present invention used in conjunction with this type of stepper motor, the stepper motor is used to move a valve seat between two extreme positions which represent completely opened and completely closed positions of the valve. If the stepper motor requires 48 counts, or input pulses, to cause the rotor of the stepper motor to complete one revolution, and the gearing connection between the shaft of the stepper motor and the valve seat requires slightly more than 41 complete revolutions of the stepper motor rotor, the present invention can maintain an accurate detection of the valve position through its complete range of travel. More specifically, the twelve bit capability of counters U4, U5 and U6 provide a maximum digital capability of 4095. Since this particular type of stepper motor requires 48 counts per revolution and the counters are set to their mid-range value of 2048 during the power up sequence, the present invention is capable of monitoring the precise position of the rotor through 42.67 rotations of the stepper motor as the stepper motor causes the valve seat to move from one extreme position (i.e. fully opened) to its other its extreme position (i.e. fully closed). It should be understood that proper design techniques would naturally take into consideration the full range of travel required by the device being moved by the stepper motor, the number of pulses required to cause the stepper motor rotor to rotate one complete revolution and the digital capability of the counters used.

Wave forms A and C, illustrated in FIG. 3 and described above, are referred to as the first and second input signals in the summary of the invention section above. Similarly, wave forms A' and C' are referred to as the first and second inverted input signals. Wave form I and wave form K are referred to as the first signal and second signal, respectively. Therefore, the components contained in dashed boxes 26, 30 and 32 in FIG. 2 comprise the portion of the circuit referred to as the first means for providing a first signal and a second signal in the above discussion. The third signal described above is analogous to the output signal on line 46 and, therefore, the components contained in dashed boxes 36 and 40, along with device U8, combine to form the portion of the circuit in FIG. 2 referred to as the second means for providing a third signal whose magnitude is representative of the rotational position of the stepper motor rotor.

Although the present invention has been described with considerable specificity and illustrated to show a particular preferred embodiment, it should be understood that many other embodiments of the present invention should be considered within its scope. Similarly, although the devices illustrated in FIG. 2 have been identified by specific type or value, it should be understood that alternative components and devices can be used to perform the functions described above.

What I claim is:

1. A position monitor for a stepper motor, comprising:

first means connected in signal communication with said stepper motor for providing a first signal and a second signal, said first signal comprising a plurality of pulses, each of said plurality of pulses representing a change of the voltage magnitude of a phase winding of said stepper motor, said second signal representing the direction of rotation of a rotor of said stepper motor;

second means, connected in signal communication with said first providing means, for providing a third signal, the magnitude of said third signal being representative of the rotational position of said rotor of said stepper motor, the magnitude of said third signal being a cumulative function of said first and second signals;

said second providing means comprises means for storing a digital value representing an accumulation of said plurality of pulses and means for selectively increasing and decreasing said digital value upon each occurrence of one of said plurality of pulses as a function of said second signal; and said second providing means comprises means for converting said digital value to a voltage magnitude.

2. The monitor of claim 1, wherein:
   said storing means comprises a counter.

3. The monitor of claim 1, wherein:
   said converting means comprises a digital-to-analog converter and a current to voltage converter.

4. The monitor of claim 1, wherein:

said first providing means comprises means for providing four internal signals representing a first phase voltage of said stepper motor, a second phase voltage of said stepper motor, an inverted form of said first phase voltage of said stepper motor and an inverted form of said second phase voltage of said stepper motor.

5. The monitor of claim 4, wherein:
said four internal signals are connected as inputs to an OR device, the output of said OR device being said first signal.

6. The monitor of claim 1, wherein:
said first providing means comprises a means for delaying a signal representing the voltage magnitude of a phase of a stepper motor.

7. A position monitor for a stepper motor, comprising:
first means for receiving a first input signal representing a voltage magnitude of a first phase winding of a stepper motor;
first means for inverting said first input signal to form a first inverted input signal;
second means for receiving a second input signal representing a voltage magnitude of a second phase winding of a stepper motor;
second means for inverting said second input signal to form a second inverted input signal;
means, connected in signal communication with said first and second receiving means and said first and second inverting means, for forming individual pulse signals representing voltage magnitude changes of said first input signal, said first inverted input signal, said second input signal and said second inverted input signal;
means, connected in signal communication with said forming means, for providing a first signal, said first signal comprising a plurality of pulses, each of said plurality of pulses representing the occurrence of one and only one of said individual pulse signals of said forming means; and
means, connected in signal communication with said first receiving means, for delaying said first input signal and providing a second signal when either said delayed first input signal or said second input signal is logically high but not when both of said delayed first input signal and said second input signal are logically high.

8. The monitor of claim 7, further comprising:
means for maintaining a digital value; and
means, connected in signal communication with said maintaining means, for changing the magnitude of said digital value, as a function of said second signal upon each occurrence of one of said plurality of pulses of said first signal.

9. The monitor of claim 8, further comprising:
means for converting said digital value to an analog current value.

10. The monitor of claim 9, further comprising:
means for converting said analog current value to an analog voltage signal.

11. A position monitor for a stepper motor, comprising:
first means for receiving a first input signal representing the voltage magnitude of a first phase of said stepper motor;
second means for receiving a second input signal representing the voltage magnitude of a second phase of said stepper motor;
first means, connected in signal communication with said first and second receiving means, for providing a first signal, said first signal comprising a plurality of pulses, each of said plurality of pulses representing a voltage magnitude change of said first or second input signals;
means, connected in signal communication with said first receiving means, for providing a first delayed input signal by delaying said first input signal; and
means, connected in signal communication with said providing means and said second receiving means, for comparing said first delayed input signal with said second input signal and providing a second signal when either said first delayed input signal or said second input signal is logically high but not when both said first delayed input signal and said second input signal are logically high.

12. The monitor of claim 11, further comprising:
means, connected in signal communication with said first providing means, for storing a digital value, the magnitude of said digital value being representative of an accumulation of said plurality of pulses of said first signal.

13. The monitor of claim 12, further comprising:
means, connected in signal communication with said second signal providing means, for changing said magnitude of said digital value upon each occurrence of one of said plurality of pulses as function of said second signal.

14. The monitor of claim 13, further comprising:
means, connected in signal communication with said storing means, for converting said digital value to an analog current value.

15. The monitor of claim 14, further comprising:
means, connected in signal communication with said converting means, for changing said analog current value to an analog voltage signal.

16. A method for monitoring the position of a stepper motor, comprising:
receiving a first input signal representing the voltage magnitude of a first phase of said stepper motor;
receiving a second input signal representing the voltage magnitude of a second phase of said stepper motor;
providing a first signal, said first signal comprising a plurality of pulses, each of said plurality of pulses representing a change of voltage magnitude of said first or second input signals;
providing a first delayed input signal by delaying said first input signal; and comparing said first delayed input signal with said second input signal and providing a second signal when either said first delayed input signal or said second input signal is logically high but not when both said first delayed input signal and said second input signal are logically high.

17. The method of claim 16, further comprising:
storing a digital value, the magnitude of said digital value being representative of an accumulation of said plurality of pulses of said first signal.

18. The method of claim 17, further comprising:
changing said magnitude of said digital value upon each occurrence of one of said plurality of pulses as a function of said second signal.

19. The method of claim 18, further comprising:
converting said digital value to an analog value.

20. The method of claim 19, further comprising: converting said analog current value to an analog voltage signal.

21. A position monitor for a stepper motor comprising:
a first circuit, connected in signal communication with said stepper motor, for providing a first signal and a second signal, said first signal comprising a plurality of pulses, each of said plurality of pulses representing a change of the voltage magnitude of a phase winding of said stepper motor, said second signal representing the direction of rotation of a rotor of said stepper motor; and
a second circuit, connected in signal communication with said first circuit, for providing a third signal, the magnitude of said third signal being representative of the rotational position of said rotor of said stepper motor, the magnitude of said third signal being an accumulative function of said first and second signals.

22. The monitor of claim 21, wherein:
said second circuit comprises a counter for storing a digital value representing an accumulation of said plurality of pulses and for selectively increasing and decreasing said digital value upon each occurrence of one of said plurality of pulses as a function of said second signal.

23. The monitor of claim 22 wherein:
said second circuit comprises means for converting said digital value to a voltage magnitude.

24. The monitor of claim 23, wherein:
said converting means comprises a digital-to-analog converter and a current to voltage converter.

25. The monitor of claim 21, wherein:
said first circuit comprises means for providing four internal signals representing a first phase voltage of said stepper motor, a second phase voltage of said stepper motor, an inverted form of said first phase voltage of said stepper motor and an inverted form of said second phase voltage of said stepper motor.

26. The monitor of claim 25, wherein:
said four internal signals are connected as inputs to an OR device, the output of said OR device being said first signal.

27. The monitor of claim 21, wherein:
said first circuit comprises a means for delaying a signal representing the voltage magnitude of a phase of a stepper motor.

28. A position monitor for a stepper motor comprising:
first means for receiving a first input signal representing a voltage magnitude of a first phase winding of a stepper motor;
first means for inverting said first input signal to form a first inverted input signal;
second means for receiving a second input signal representing a voltage magnitude of a second phase winding of a stepper motor;
second means for inverting said second input signal to form a second inverted input signal;
a first circuit, connected in signal communication with said first and second receiving means and said first and second inverting means, for forming individual pulse signals representing voltage magnitude changes of said first input signal, said first inverted input signal, said second input signal and said second inverted input signal;
a second circuit, connected in signal communication with said first circuit, for providing a first signal, said first signal comprising a plurality of pulses, each of said plurality of pulses representing the occurrence of one and only one of said individual pulse signals of said first circuit; and
means, connected in signal communication with said first receiving means, for delaying said first input signal and providing a second signal when either said delayed first input signal or said second input signal is logically high but not when both of said delayed first input signal and said second input signal are logically high.

29. The monitor of claim 28, further comprising:
a counter for maintaining a digital value; and
means, connected in signal communication with said counter means, for changing the magnitude of said digital value, as a function of said second signal upon each occurrence of one of said plurality of pulses of said first signal, said counter being connected in signal communication with said second circuit.

30. The monitor of claim 29, further comprising:
a digital-to-analog converter connected in signal communication with said counter for converting said digital value to an analog current value.

31. The monitor of claim 30, further comprising:
means for converting said analog current value to an analog voltage signal.

32. A position monitor for a stepper motor, comprising:
first means for receiving a first input signal representing the voltage magnitude of a first phase of said stepper motor;
second means for receiving a second input signal representing the voltage magnitude of a second phase of said stepper motor;
a first circuit, connected in signal communication with said first and second receiving means, for providing a first signal, said first signal comprising a plurality of pulses, each of said plurality of pulses representing a voltage magnitude change of said first or second input signals;
means, connected in signal communication with said first receiving means, for providing a first delayed input signal by delaying said first input signal; and
a second circuit means, connected in signal communication with said first circuit and said second receiving means, for comparing said first delayed input signal with said second input signal and providing a second signal when either said first delayed input signal or said second input signal is logically high but not when both said first delayed input signal and said second input signal are logically high.

33. The monitor of claim 32, further comprising:
a counter, connected in signal communication with said first circuit, for storing a digital value, the magnitude of said digital value being representative of an accumulation of said plurality of pulses of said first signal.

34. The monitor of claim 33, further comprising:
means, connected in signal communication with said second signal providing means, for changing said magnitude of said digital value upon each occurrence of one of said plurality of pulses as function of said second signal.

35. The monitor of claim 34, further comprising:

a digital to analog converter, connected in signal communication with said counter, for converting said digital value to an analog current value.

36. The monitor of claim 35, further comprising an operational amplifier, connected in signal communication with said converting means, for changing said analog current value to an analog voltage signal.

37. The monitor of claim 33, further comprising: means for setting said stored digital value to a predetermined magnitude during a power up sequence.

* * * * *